Aug. 14, 1951   F. TURRETTINI   2,564,180
SCREW AND NUT GEARING
Filed Jan. 25, 1946   2 Sheets-Sheet 2

Inventor
F. Turrettini

Patented Aug. 14, 1951

2,564,180

UNITED STATES PATENT OFFICE 2,564,180

SCREW AND NUT GEARING

Fernand Turrettini, Bellevue-Geneva, Switzerland, assignor to firm Societe Genevoise D'Instruments De Physique, Geneva, Switzerland, a firm of Switzerland Application January 25, 1946, Serial No. 643,364
In Switzerland October 30, 1945

2 Claims. (Cl. 74—424.8)

The present invention concerns a machine tool comprising a vertical guide with feed screw and a tool slide movable thereon.

An object of the invention is to provide a simple means for having a single feed screw used for operating both a tool slide and a cross-beam.

A feature of the invention is the combination of a vertical guide, a tool slide movable thereon, a feed screw, a first threaded sleeve rotatably mounted in said slide and on said screw, means for rotating said screw, means for rotating said sleeve, a second threaded sleeve operatively connected to the first one, and an axial spring between said sleeves, whereby the friction between screw and sleeves is definitely superior to that between sleeve and slide.

The accompanying drawing represents, by way of example, one executional form of the machine tool forming the object of the invention.

Figure 1:
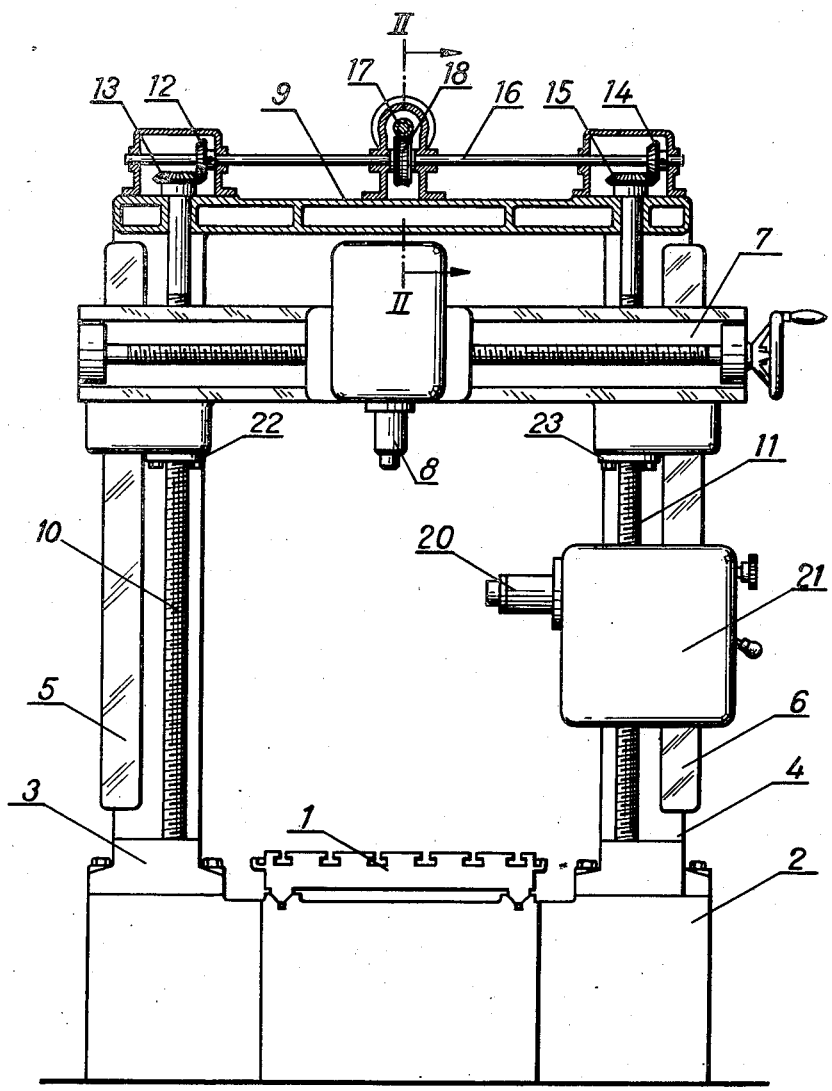
Fig. 1 is a schematic front elevation with a partial section.
Figure 2:
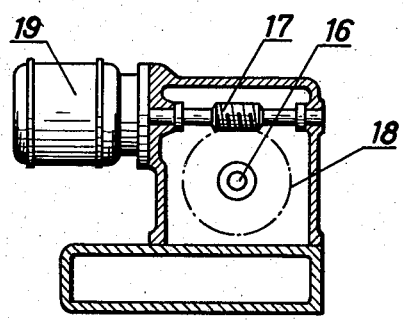
Fig. 2 is a section at a larger scale through II—II of Fig. 1.

The machine tool represented is a vertical boring machine comprising a horizontal spindle. The working table 1 rests on the base 2; two lateral uprights 3 and 4 are provided with guiding surfaces 5 and 6 on which slides a crossbeam 7 carrying a vertical spindle 8. The bridge 9 connects the two uprights containing the two elevating screws 10 and 11 of the movable crossbeam. These screws are driven by means of a pair of bevel gears 12—13 and 14—15, by a shaft 16 and by a pair of irreversible helical gears 17 and is controlled by a motor 19.

In order to simplify the description, only one horizontal spindle 20 carried by a saddle 21 guiding it along the upright 4, is shown in this executional form.

Figure 3:
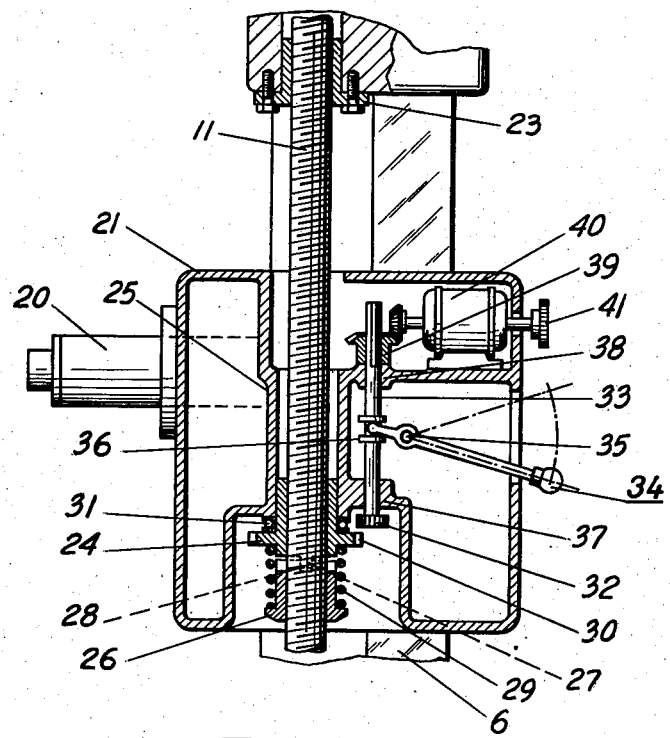
Fig. 3 shows in section and at a larger scale a portion of Fig. 1.

The crossbeam 7 is suspended on the elevating screws 10 and 11 by means of two nuts 22 and 23 rigidly connected to the crossbeam. The elevating screw 11 also supports the saddle 21 (see Fig. 3) by means of a nut 24 arranged in a bore 25 where it may rotate freely. A brake is formed by a counter-nut 26 rotatably connected to the nut 24 by means of a nose 27 engaging with a slot 28. A spring 29 is inserted between the nut 24 and the counter-nut 26, in order to produce sufficient friction in the threads of these nuts, so that they rotate freely with the screw 11 and that consequently, the action of this screw, when in movement, is without effect on the position of the saddle 21.

A thrust ball bearing 31 is inserted between the saddle 21 and the nut 24, in order to reduce the required power of the brake.

The nut 24 is a part of a gear 30 which may mesh with a pinion 32 solidary with a shaft 33 movable axially under the action of a lever 34 pivoted at 35 and acting at 36 on a collar of said shaft.

The shaft 33 slides in bearings 37 and 38 as well as in a bevel gear 39 driven by a motor 40 which serves to operate the mechanical movement of the saddle 21. The motor may be started by the action of lever 34 as well as by additional, not indicated means. In order to adjust the exact height of the saddle 21, a knob 41 solidary with the shaft of the motor 40 may be hand-operated, and this when the motor is not under pressure. It is clear that the general arrangement could be inverted without exceeding the scope of the invention, and this in such a manner that the functions of the nuts 23 and 24 are mutually interchanged.

It is also clear that the applications of the invention are not solely limited to the case of a vertical boring machine, which has just been described, but that it could be extended in a general manner to include any other type of machine tool comprising at least two mobile organs along one and the same guide, as for instance the classic shaping machine possessing two uprights and provided with a crossbeam carrying a tool-holder carriage acting parallel to the plane of the table, as well as with lateral tool-holders, for machining the vertical faces of the same work piece.

What I claim is:

1. In a machine tool comprising a vertical guide, a tool carriage movable thereon, a feed screw, and means for rotating said screw, in combination, a first threaded sleeve rotatably mounted in said carriage and screwed on said feed screw, said sleeve carrying said carriage, means for rotating said first sleeve, a second threaded sleeve screwed on said feed screw, means for making said sleeves angularly dependent from another while leaving them axially free, and a spring situated between said threaded sleeves and bearing on them so as to produce between screw and sleeves such a friction that the sleeves rotate with the screw upon rotation of this latter.

2. In a machine tool comprising a vertical guide, a tool carriage movable thereon, a feed screw and means for rotating said screw, in combination, a first threaded sleeve rotatably mounted in said carriage and screwed on said feed screw, said sleeve carrying said carriage, mechanized means for rotating said first sleeve, a second threaded sleeve screwed on said feed screw, means for making said sleeves angularly dependent from another while leaving them axially free, and a spring situated between said threaded sleeves and bearing on them so as to produce between screw and sleeves such a friction that the sleeves rotate with the screw upon rotation of this latter, whereby upon rotating of the sleeves the carriage moves up and down while upon rotating the feed screw the sleeves rotate with and the carriage is not displaced.

FERNAND TURRETTINI.

REFERENCES CITED

The following references are of record in the file of this patent:

UNITED STATES PATENTS

| Number | Name | Date |
| --- | --- | --- |
| 1,034,150 | Silberman | July 30, 1912 |

FOREIGN PATENTS

| Number | Country | Date |
| --- | --- | --- |
| 699,426 | Germany | Nov. 28, 1940 |